United States Patent
Price et al.

(10) Patent No.: US 12,277,681 B2
(45) Date of Patent: *Apr. 15, 2025

(54) TEMPORAL FILTERING WEIGHT COMPUTATION

(71) Applicant: Microsoft Technology Licensing, LLC, Redmond, WA (US)

(72) Inventors: Raymond Kirk Price, Redmond, WA (US); Christopher Douglas Edmonds, Carnation, WA (US); Michael Bleyer, Seattle, WA (US); Christian Markus Maekelae, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,376

(22) Filed: Jun. 19, 2023

(65) Prior Publication Data

US 2023/0334636 A1 Oct. 19, 2023

Related U.S. Application Data

(63) Continuation of application No. 17/524,274, filed on Nov. 11, 2021, now Pat. No. 11,756,177.

(51) Int. Cl.
| | |
|---|---|
| *G06T 5/50* | (2006.01) |
| *G06T 3/40* | (2024.01) |
| *G06T 5/70* | (2024.01) |
| *H04N 23/68* | (2023.01) |

(52) U.S. Cl.
CPC ............ *G06T 5/50* (2013.01); *G06T 3/40* (2013.01); *G06T 5/70* (2024.01); *H04N 23/6812* (2023.01); *H04N 23/682* (2023.01); *G06T 2207/20216* (2013.01); *G06T 2207/20224* (2013.01)

(58) Field of Classification Search
None
See application file for complete search history.

(56) References Cited

U.S. PATENT DOCUMENTS

| | | | | |
|---|---|---|---|---|
| 11,756,177 | B2 * | 9/2023 | Price | H04N 23/682 |
| | | | | 348/208.2 |
| 2009/0161756 | A1 * | 6/2009 | Lin | H04N 19/117 |
| | | | | 375/E7.076 |
| 2018/0020229 | A1 * | 1/2018 | Chen | H04N 19/132 |
| 2020/0267339 | A1 * | 8/2020 | Douady-Pleven | H04N 19/136 |
| 2023/0319407 | A1 * | 10/2023 | Kaji | H04N 23/73 |

* cited by examiner

*Primary Examiner* — Quan Pham
(74) *Attorney, Agent, or Firm* — Workman Nydegger (57) ABSTRACT

Techniques to temporally filter images via a filtering weight computation are disclosed. A first image having a first timestamp and a second image having a second timestamp are acquired. These images are generated by a camera, and the first timestamp is before the second timestamp. A motion compensation (MC) operation is performed on the first image to produce an MC image. A difference image is generated using the MC image and the second image. The difference image reflects differences in intensities that exist between the two images. A local weight map is generated based on those differences. A global weight map is generated based on certain IMU data. A final weight map is generated based on a combination of the local weight map and the global weight map. The final weight map is used to generate a filtered image.

19 Claims, 7 Drawing Sheets

TEMPORAL FILTERING WEIGHT COMPUTATION

CROSS-REFERENCE TO RELATED APPLICATIONS

This application is a continuation of U.S. patent application Ser. No. 17/524,274 filed on Nov. 11, 2021, entitled "TEMPORAL FILTERING WEIGHT COMPUTATION," which application is expressly incorporated herein by reference in its entirety.

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment creates many challenges, however.

To improve the quality of the images that are displayed to a user, some MR systems perform what is called "temporal filtering." Temporal filtering refers to the process by which the system combines data that is captured over multiple timepoints in order to generate a particular output. In other words, the system essentially stacks multiple images on top of one another and combines them in a manner so as to produce an aggregated image having an improved quality.

For instance, in the MR system scenario, the system combines image data of consecutively captured images in order to generate an improved output. As an example, consider a low light scenario. Because of the low light, each individual image might be capable of providing only a limited amount of image data. By combining the data from multiple consecutively captured images, however, the system (e.g., by combining the data from all of those images via temporal filtering) can produce a suitable output image. In this sense, the process of temporal filtering involves capturing multiple image frames over a period of time and then combining the image data from those frames to produce an output frame, resulting in a scenario where the output frame is actually an aggregation of multiple input frames.

Various challenges occur when performing temporal filtering, however. For example, so-called "ghosting effects" can result if an object in the scene or environment is moving while the system captures the multiple consecutive images. More particularly, ghosting occurs when an object or image artifact has a trail of pixels that follow the object (e.g., a form of motion blur). This trail of pixels occurs because the object is at different locations while the multiple consecutive images are being generated, and those different locations are then reflected in the final composite image.

Another challenge occurs when the camera itself undergoes movement while it is generating the images. Movements of the camera can also skew the temporal filtering process. In view of these challenges, as well as others, there is a substantial need to improve the temporal filtering process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods for performing temporal filtering. More specifically, the disclosed principles are focused on a unique type of filtering weight computation.

In some embodiments, the filtering weight computation involves acquiring a first image having a first timestamp, where that first image is generated by a camera. The embodiments also acquire a second image having a second timestamp. The second image is also generated by the camera. Here, the first timestamp is before the second timestamp such that the first image is a previously acquired image relative to the second image. A motion compensation (MC) operation is performed on the first image to account for motion that might have occurred during a time between the first timestamp and the second timestamp. As a result, an MC image is generated. A difference image is generated using the MC image and the second image. The difference image reflects differences in intensities that exist between corresponding pixels in both the MC image and the second image. A local weight map is generated based on the differences in intensities in the difference image. The embodiments also generate a global weight map based on inertial measurement unit (IMU) data that was generated by an IMU. The IMU data reflects both an angular movement of the camera and an acceleration of the camera during a period between the first and second timestamps. A final weight map is then generated based on a combination of the local weight map and the global weight map. The final weight map is used to generate a filtered image. Then, during a subsequent iteration of the filtering weight computation, the embodiments cause the filtered image to be used as the previously acquired image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein relate to systems, devices (e.g., wearable devices, hardware storage devices, etc.), and methods for performing temporal filtering. More specifically, the disclosed principles are focused on a unique type of filtering weight computation.

The embodiments acquire a first image having a first timestamp and a second image having a second timestamp. These images are generated by a camera, and the first timestamp is before the second timestamp. A motion compensation (MC) operation is performed on the first image to produce an MC image. A difference image is generated using the MC image and the second image. The difference image reflects differences in intensities that exist between the two images. A local weight map is generated based on those differences. A global weight map is generated based on IMU data that was generated between the first and second timestamps. The IMU data reflects both an angular position of the camera and an acceleration of the camera at the time corresponding to the second timestamp. A final weight map is then generated based on a combination of the local weight map and the global weight map. The final weight map is used to generate a filtered image, which is provided as feedback during a subsequent iteration of the filtering weight computation.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications to the technical field. That is, the embodiments provide improvements to the technical field of temporal filtering and generating images.

In particular, the embodiments are able to provide enhanced imagery to a user. To do so, the disclosed principles are focused on a new type of temporal filtering weight computation that incorporates the generation and use of different mappings. One mapping is based on image content while the other mapping is based on non-image content, such as IMU data. By combining the data from these mappings, the embodiments are able to generate a final weight map and are able to use that weight map to generate a motion compensated temporally filtered image.

Furthermore, the use of multiple different maps provides other advantages as well. To illustrate, the use of multiple different maps help safeguard against possible ghosting effects (i.e. motions of objects in the scene) and also help control how much influence one image (e.g., the first image) will have in generating the resulting temporally filtered image, thereby safeguarding against camera motions. The combination of these two maps (via a multiplication operation) helps determine the level or amount of temporal filtering that should be performed in order to generate an improved output image.

For instance, if the camera is moving, then a motion compensation operation can be performed to compensate for that motion. As used herein, the phrase "motion compensation" (MC) refers to a process by which the pose in one image is modified based on motion data (e.g., IMU data). The modification is designed to have the original pose match a subsequent or predicted pose, which is predicted based on the IMU data.

If the camera is moving too quickly, then the resulting motion compensation operation will likely be poor (e.g., the prediction will likely not be as accurate because of the large amount of movement). Motion compensated temporal filtering relies on the motion compensation operation. Therefore, under such undesirable conditions, it is desirable to reduce the amount of temporal filtering (i.e. the process of combining multiple successively generated image) because of the significant discrepancy that will likely be present in those images.

On the other hand, if the camera is not moving or is moving less than a threshold amount, then it is desirable to perform temporal filtering and to combine the data from one or more (and perhaps many) successively generated images in order to produce a high quality output image. A similar analysis can be performed when objects in the scene are moving. In this sense, the embodiments improve the determination as to how and even as to when temporal filtering should be performed in order to achieve a high quality output image.

The resulting output image (i.e. a "temporally filtered image" or simply a "filtered image") can then be provided to a user to view and potentially interact with. Additionally, this filtered image can be fed back into the computation in order to improve subsequent iterations of the computation.

Improved performance of the computer system can also be achieved. For instance, the performance of the computer can be increased via selective and intelligent down-sampling operations in order to reduce the amount of compute that is needed. Furthermore, improved imagery is achieved over time. Another benefit involves the ability for the system to operate in sub-optimal conditions, such as low light conditions. For instance, the disclosed principles can be practiced in low luminance environments where the camera sensors might possibly detect less than 1 photon per image frame. Despite these sub-par conditions, the embodiments beneficially achieve improved output signals by temporally averaging multiple frames together.

The embodiments also beneficially reduce or entirely eliminate ghosting effects, which might otherwise occur in traditional systems when objects in the scene are moving. The principles can also be implemented even where there are high levels of noise in the generated images, or when there is a low signal to noise ratio for the imagery. That is, the principles can be practiced in a broad range of conditions. Accordingly, these and numerous other benefits will now be described throughout the remaining portions of this disclosure.

Example MR Systems and HMDs

Figure 1:
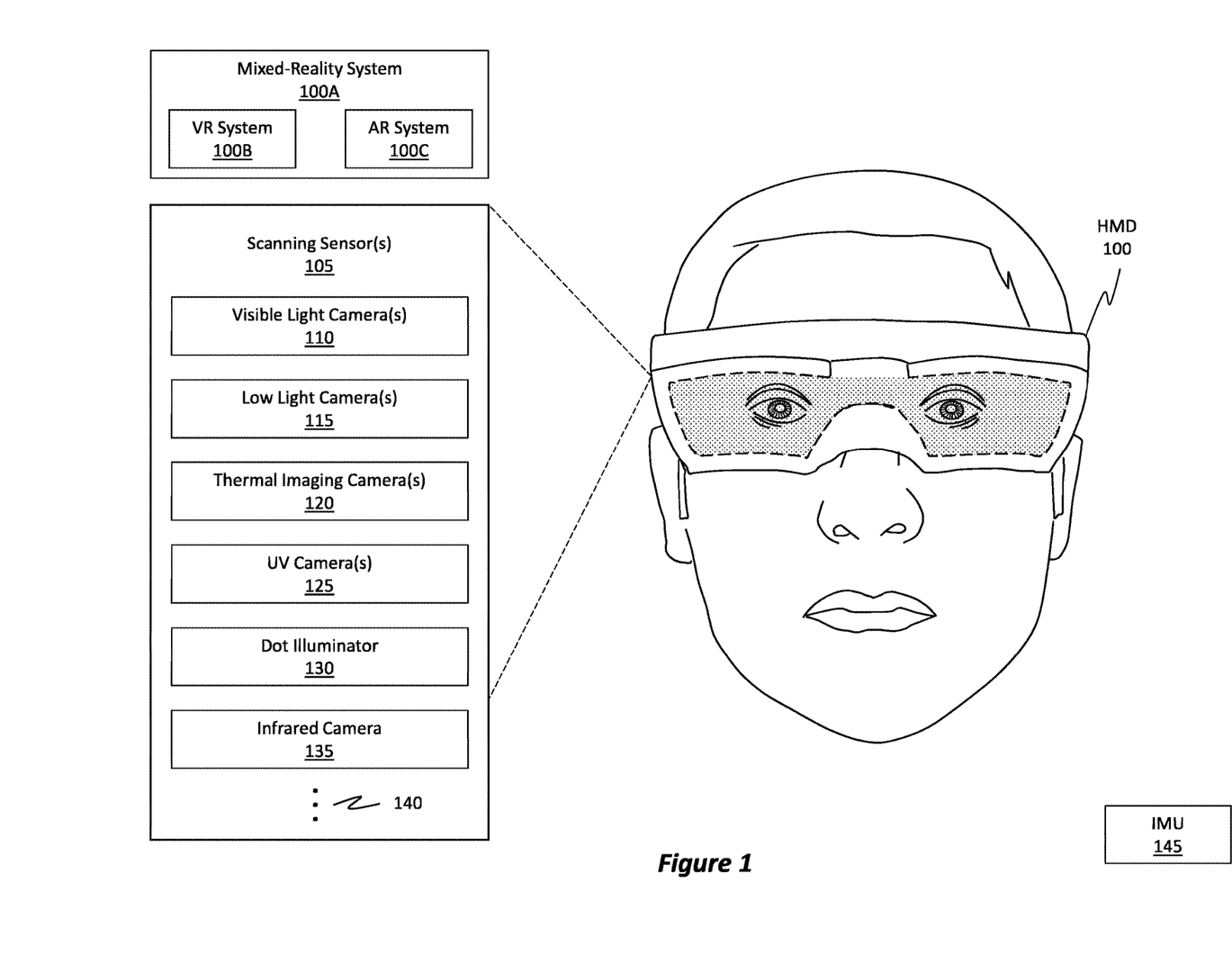
FIG. 1 illustrates an example of an HMD.

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed. A passthrough image can be generated as a result of performing temporal filtering on multiple consecutively generated images.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially ultraviolet (UV) camera(s) 125, potentially a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

In some embodiments, the visible light camera(s) 110 and the low light camera(s) 115 (aka low light night vision cameras) operate in approximately the same overlapping wavelength range. In some cases, this overlapping wavelength range is between about 400 nanometers and about 1,100 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 110 are low power cameras and operate in environments where the illuminance is between about 10 lux and about 100,000 lux, or rather, the illuminance range begins at about 10 lux and increases beyond 10 lux. In contrast, the low light camera(s) 115 consume more power and operate in environments where the illuminance range is between about 110 micro-lux and about 10 lux.

The thermal imaging camera(s) 120, on the other hand, are structured to detect electromagnetic radiation or IR light in the far-IR (i.e. thermal-IR) range, though some embodiments also enable the thermal imaging camera(s) 120 to detect radiation in the mid-IR range. To clarify, the thermal imaging camera(s) 120 may be a long wave infrared imaging camera structured to detect electromagnetic radiation by measuring long wave infrared wavelengths. Often, the thermal imaging camera(s) 120 detect IR radiation having wavelengths between about 8 microns and 14 microns. These wavelengths are also included in the light spectrum(s). Because the thermal imaging camera(s) 120 detect far-IR radiation, the thermal imaging camera(s) 120 can operate in any illuminance condition, without restriction.

The HMD 100 can also be equipped with an inertial measurement unit (IMU), as shown by IMU 145. The IMU 145 measures forces, angular rates, and orientation using a combination of accelerometers, gyroscopes, and magnetometers. The IMU 145 produces IMU data, which can be used by the disclose embodiments.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

The disclosed embodiments may be structured to utilize numerous different camera modalities. The different camera modalities include, but are not limited to, visible light or monochrome cameras, low light cameras, thermal imaging cameras, and UV cameras.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

In some scenarios, noise may be present in one of the images. For instance, in very low light conditions (e.g., 1.0 millilux or "starlight" environments), there might not be enough light photons in the environment for the low light camera to generate a high quality image. Indeed, the resulting image generated by the low light camera may be heavily corrupted with noise. When such conditions occur, the embodiments are beneficially able to perform temporal filtering. More details on temporal filtering will be provided shortly.

By way of reference, however, it is beneficial to note the general illuminance metrics for different scenarios. For instance, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, a so-called "low light environment" at least corresponds to any environment in which the ambient light intensity is at or below about 40 lux. The HMD has one or more sensors that are configured to determine the surrounding environment lux intensity. These sensors can be incorporated into or independent from the cameras and/or illuminators described herein.

When used in a very low light environment (e.g., about 1.0 millilux or "starlight" environments), the low light camera sensors attempt to compensate for the low light condition by ramping up the camera's gain (e.g., digital gain, analog gain, or a combination of digital and analog gain). As a result of ramping up the camera sensor's gain, the resulting image can be very noisy. In an effort to improve the quality of the images, the embodiments perform temporal filtering.

(Motion Compensated) Temporal Filtering

Figure 2:
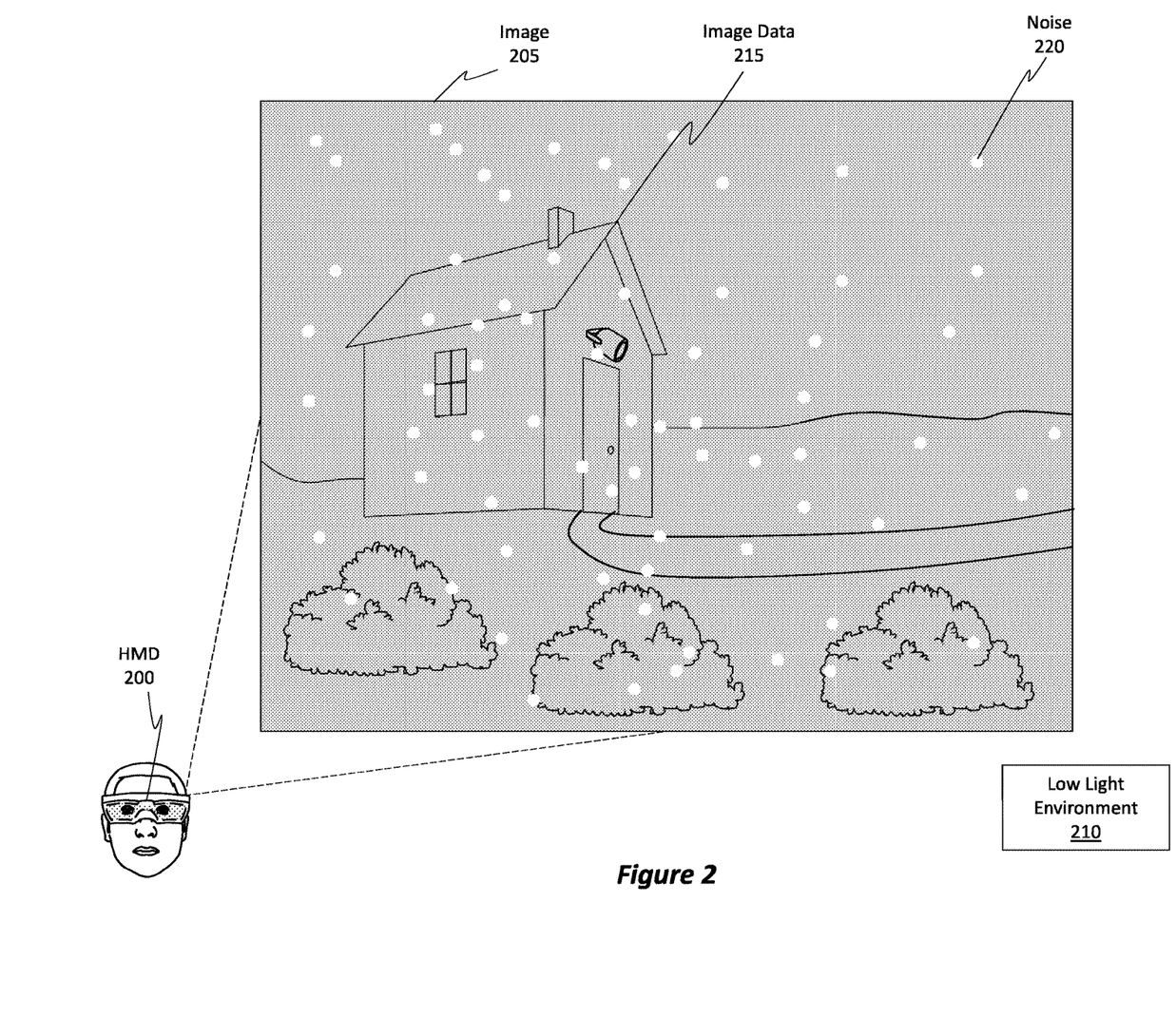
FIG. 2 illustrates how the HMD can generate an image and how, in some cases, that image might be noisy.
Figure 3:
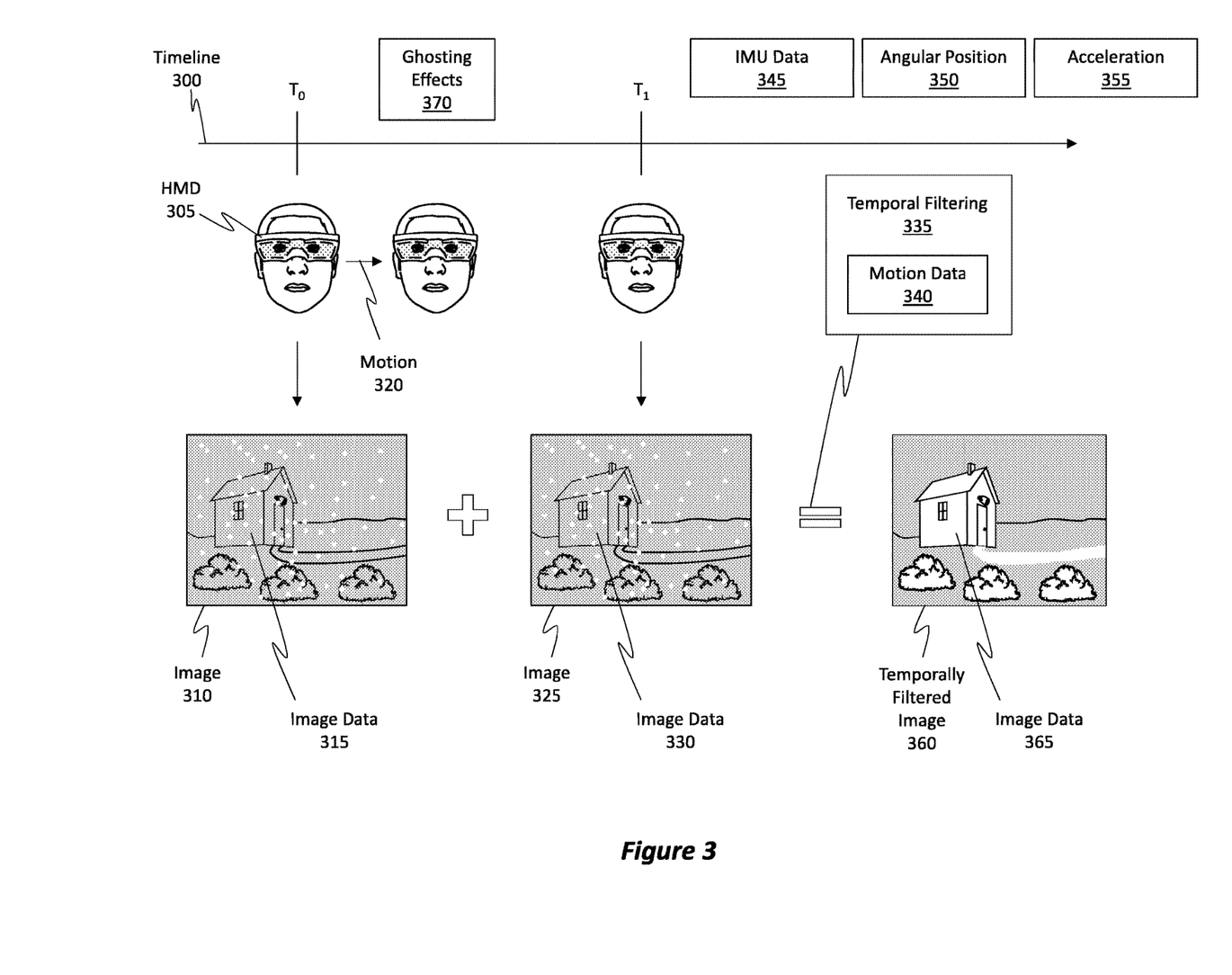
FIG. 3 illustrates an example timeline illustrating how temporal filtering is performed.

FIG. 2 shows an HMD 200, which is representative of the HMD 100 of FIG. 1. HMD 200 has generated an image 205 in a low light environment 210. As shown, the image 205 includes various different image data 215. Because the image 205 was generated in a low light scenario, however, there is a significant amount of noise 220 (e.g., the white dots throughout the image 205). If used by itself, the image 205 would provide a generally poor quality image for presentation to a user. With that understanding, then, the embodiments are configured to perform temporal filtering. FIG. 3 provides some useful details.

FIG. 3 shows a timeline 300. At time $T_0$, an HMD 305 (which is representative of the HMDs discussed thus far) generates an image 310 that includes image data 315. Similar to the scenario presented in FIG. 2, the image 310 was generated in a low light environment. FIG. 3 also notes how, subsequent to time $T_0$, the HMD undergoes some amount of motion 320 or movement.

At time $T_1$, the HMD 305 then generates a second image 325, which includes image data 330. In accordance with the disclosed principles, the embodiments are able to use image 310 and image 325 to perform a temporal filtering 335 operation. The embodiments can also use motion data 340 generated by an IMU to compensate for the motion 320 that occurred between time $T_0$ and $T_1$. That is, the embodiments can acquire IMU data 345, which details the angular position 350 and the acceleration 355 of the camera that generated the images 310 and 325. The angular position 350 details the orientation of the camera using a three degrees of freedom (DOF) basis, while the acceleration 355 details whether the camera is translating or moving.

As mentioned earlier, the motion compensation operation generally involves modifying one pose to match a different pose. The different pose might be a predicted pose based on the motion data 340. As an example, image 310 reflected or embodied a first pose of the HMD 305 at time $T_0$. The HMD 305 then shifted to a new position or pose, as shown by motion 320. The IMU captured the movement of the HMD 305 between time $T_0$ and $T_1$. The HMD 305 can use the IMU data to predict a new pose of the HMD 305 at time $T_1$ (or perhaps even a later time). Based on this prediction, the HMD 305 can then perform a motion compensation operation to transform the pose embodied in image 310 to reflect the predicted pose of the HMD 305 (as it will be at time $T_1$). At time $T_1$, the HMD 305 generates the image 325. The embodiments are able to compare the motion compensated pose (which was designed in an attempt to reflect the HMD 305's pose at time $T_1$) with the actual pose of the HMD 305 at time $T_1$. The level or amount of difference between those two poses reflects the accuracy of the motion compensation. If there is no difference, then the motion compensation operation was 100% successful. On the other hand, the larger the amount of difference, the worse the motion compensation performed. Measuring or comparing the differences is primarily performed by comparing each pixel's intensity level with one another. That is, a first pixel in the motion compensated image is identified, and a corresponding pixel in the image 325 is identified. The intensity levels for these two pixels are compared against one another. The resulting difference between those two values reflects the accuracy of the motion compensation operation.

Performing motion compensation is desirable because of the temporal filtering process. Recall, the temporal filtering process essentially stacks multiple images on top of one another and combines the data from those images to generate an enhanced image. For the stacking to work properly, the poses in each of those different images should align with one another. Thus, the motion compensation operation is performed in order to align the various different poses for the various different images.

As a result of performing the temporal filtering 335 operation, the embodiments are able to generate a temporally filtered image 360 that has improved or enhanced image data 365 as compared to the image data 315 and 330 of the previous images. Additionally, as will be described momentarily, not only do the embodiments beneficially compensate for motions of the camera, but the embodiments also beneficially reduce the impact of ghosting effects 370 for objects that are moving in the scene.

Improved Filtering Weight Computation

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
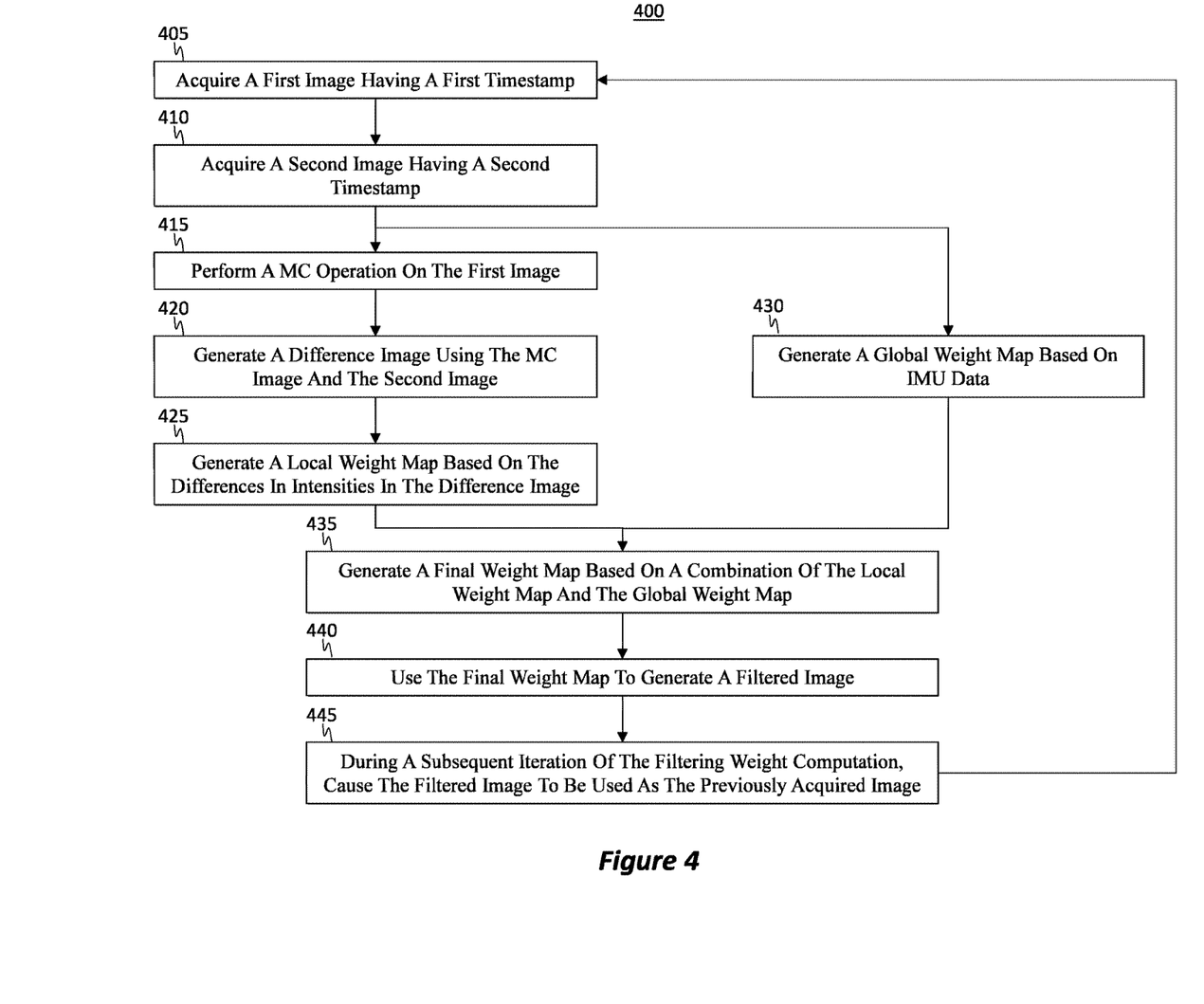
FIG. 4 illustrates a flowchart of an example method detailing improved operations for performing temporal filtering.
Figure 5:
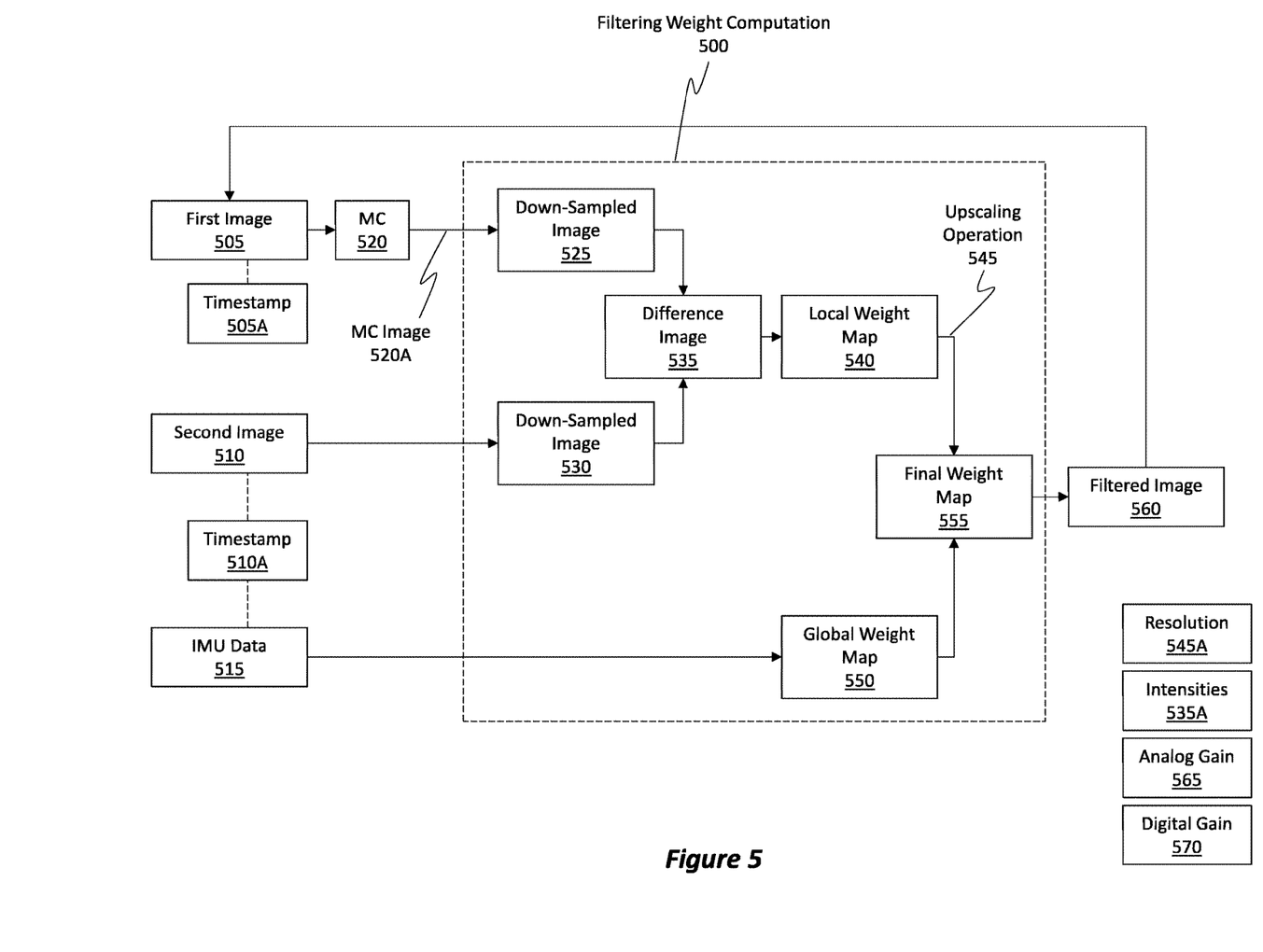
FIG. 5 illustrates an example flowchart of a filtering weight computation.

Attention will now be directed to FIG. 4, which illustrates a flowchart of an example method 400 for performing temporal filtering by executing a filtering weight computation. FIG. 5 provides additional clarification regarding the acts of method 400, so FIGS. 4 and 5 will be presented with one another.

Initially, method 400 includes an act (act 405) of acquiring a first image having a first timestamp. Notably, the first image was generated by a camera, such as perhaps a low light camera or any of the other cameras mentioned herein (e.g., any of the scanning sensor(s) 105 of FIG. 1 can be used to represent the camera). With reference to the filtering weight computation 500 of FIG. 5, FIG. 5 shows how a first image 505 is acquired, where that first image 505 has a timestamp 505A. The first image 505 could, optionally, be the image 310 from FIG. 3 and can be generated by the HMD 305.

Act 410 involves acquiring a second image having a second timestamp. The second image was also generated by the camera. The first timestamp is before the second timestamp such that the first image is a previously acquired image relative to the second image. FIG. 5 shows a second image 510 having a timestamp 510A. The second image 510 can optionally be the image 325 from FIG. 3. Image 325 was generated at time $T_1$ whereas image 310 was generated at time $T_0$; consequently, image 310 was generated prior in time to image 325. The camera can operate at different rates to acquire the images. For instance, the camera can operate anywhere from 30 frames per second (FPS) up to or even higher than 120 FPS. Often, the camera operates at 60 FPS or 90 FPS. Although the examples thus far have focused on the use of two images, one will appreciate how the embodiments can acquire any number of images.

Act 415 includes performing a motion compensation (MC) operation on the first image to account for motion that might have occurred during a time between the first timestamp and the second timestamp. The MC operation is based on IMU data. As a result of performing act 415, an MC image is generated. FIG. 5 shows an MC 520 operation performed on the first image 505 to thereby produce an MC image 520A.

The MC 520 operation is performed to compensate for movements of the camera. That is, between the time of the first timestamp 505A and the time of the second timestamp 510A, it may be the case that the camera moved some amount. The embodiments perform motion compensation to correct for that motion and to transform the pose presented or embodied in the first image 505 to match a predicted pose that is predicted will occur at a later time (e.g., to match the pose presented or embodied in the second image 510 at timestamp 510A). The transformation is performed using the IMU data mentioned previously, such as the angular position information and the acceleration information. Such transformations can be performed via various reprojection techniques.

Accordingly, as a result of performing act 415 of FIG. 4, the pose presented in the first image now supposedly corresponds to the pose presented in the second image. Notably, if the motion compensation operation were 100% accurate or true, then it should be the case that the MC image exactly matches that of the second image. Such is not always the case, however. For instance, the accuracy of the motion compensation operation often diminishes when relatively larger amounts of camera movement are detected. In contrast, the accuracy of the motion compensation operation often increases when relatively smaller amounts of camera movement are detected.

In some embodiments, subsequent to performing the MC operation, there is a down-sampling operation. Specifically, some embodiments down-sample the first image, or rather the MC image, to a selected resolution and also down-sample the second image to that same selected resolution level. By down-sampling these images, the embodiments are able to reduce or mitigate ghosting effects that may occur. For instance, operating on a lower quality image (i.e. a down-sampled image) is actually beneficial because it reduces the effects that might otherwise occur if an object were moving in the scene. Additionally, the down-sampling process significantly reduces the amount of compute required to perform the disclosed operations.

The amount of down-sampling that can occur is largely dependent on the resolution of the original images. Often, the embodiments perform a 4 pixel by 4 pixel down-sampling, though other down-sampling rates can be used. Stated differently, the MC image is often subjected to a 4 pixel by 4 pixel down-sampling, and the second image is often subjected to the same 4 pixel by 4 pixel down-sampling. Regardless of how much down-sampling occurs, the MC image and the second image are subjected to the same amount of down-sampling.

Returning to FIG. 4, method 400 also includes an act (act 420) of generating a difference image using the MC image and the second image. The difference image reflects differences in intensities that exist between corresponding pixels in both the MC image and the second image. FIG. 5 is also illustrative.

Notice, FIG. 5 shows a down-sampled image 525 and a down-sampled image 530. As mentioned earlier, subsequent to performing the MC operation and prior to generating the difference image, the filtering weight computation 500 can further include down-sampling the first image, or rather the MC image, to a selected resolution level and down-sampling the second image to the selected resolution level. The process of generating the difference image is then performed using the down-sampled MC image and the down-sampled second image, as shown by difference image 535. The process of down-sampling the MC image and the second image operates to reduce noise in the MC image and the second image and further operates to reduce the potential for ghosting effects.

The difference image 535 lists or provides differences in pixel intensity levels that exist between the MC image (down-sampled) and the second image (down-sampled). If the motion compensation operation were 100% accurate, then the difference image 535 should not have any data, or rather should have values of zero. The intensities 535A reflect the differences in intensities in the difference image 535.

It is often the case, however, that the motion compensation operation is not truly accurate, thereby resulting in differences between the two images and thereby causing the difference image to be populated with values. As a result of generating the difference image (i.e. comparing multiple successively generated images), the filtering weight computation temporally averages multiple images together. That is, multiple images, which are generated over a period of time, are essentially averaged together as a result of generating the difference image. In doing so, a higher quality output image can be produced, as will be described shortly.

Act 425 in FIG. 4 then includes generating a local weight map based on the differences in intensities in the difference image. The process of generating the local weight map based on the differences in intensities in the difference image can include converting the differences to various so-called "weight parameters" by applying a negative exponential function to the differences. In effect, the embodiments transform the "differences" to "weight" values. By applying the negative exponential function, the resulting scenario occurs: if a difference is zero, then the function outputs a weight of one (i.e. a maximum weight) for that pixel. As the difference gets larger, the function outputs a weight closer to or converging on zero (i.e. a minimum weight) for that pixel. Thus, the weights range between values of 0 and 1 in the local weight map for each pixel in the down-sampled images. In this sense, relatively larger differences in intensities that are reflected by the difference image are afforded relatively lower weights in the local weight map while relatively smaller differences in intensities that are reflected by the difference image are afforded relatively higher weights in the local weight map. In addition to or as an alternative to the negative exponential function, the embodiments can also calculate the weight using a first or second degree polynomial and/or using a reciprocal function. Accordingly, multiple different techniques are available for calculating the weights.

The local weight map generation process can also include upscaling a number (likely all) of the weight parameters in the local weight map to a number that matches an original resolution of the first image and the second image. This upscaling process can include performing one or more of a linear upscaling or a bilinear upscaling operation to smooth transitions between the weight parameters included in the local weight map. Recall, the embodiments previously down-sampled the images in an attempt to reduce noise, reduce movement/ghosting effects, and to reduce the amount of compute. At this stage, the embodiments upscale the local weight map 540 to match the original resolution of the first image 505, as shown by the upscaling operation 545 in FIG. 5. For instance, if the images were previously subjected to a 4 pixel by 4 pixel down-sampling, then the local weight map will be subjected to a 4 pixel by 4 pixel upscaling.

In some cases, the local weight map can also include, or receive as parameters to generate the weights, the analog gain setting and/or the digital gain setting of the camera that generated the images. Stated differently, the local weight map can include one or more of an analog gain setting of the camera or a digital gain setting of the camera. Higher gain values indicate higher levels of noise. Therefore, the gain settings can also be considered in order to compensate for noise.

Returning to FIG. 4, method 400 includes an act (act 430) of generating a global weight map based on inertial measurement unit (IMU) data that was generated by an IMU. The IMU data tracks the movement of the camera between the time period spanning the first timestamp and the second timestamp. Stated differently, the IMU data reflects both an angular movement of the camera and an acceleration of the camera during a period between the first timestamp and the second timestamp. Notice, act 430 is performed subsequent in time to act 410. Act 430 can be performed in parallel with any of acts 415 through 425.

As just mentioned, the IMU data reflects both an angular position of the camera and an acceleration of the camera during the time period between the first timestamp and the second timestamp. That is, the IMU data indicates the pose or orientation of the camera and further indicates whether the camera is translating. Relatively higher amounts of angular movement and acceleration of the camera result in relatively lower weight values being included in the global weight map. Notably, these weight values reflect an amount of influence the first image will have in generating the final temporally filtered image. Similarly, relatively lower amounts of angular movement and acceleration of the camera result in relatively higher weight values being included in the global weight map.

As an example, suppose the camera moved only a small amount during the time period between the first and second timestamps. In this scenario, the embodiments will weight the value or influence of the first image, or rather the MC image, relatively high because that image is likely reliable and thus can be properly stacked with the second image. On the other hand, suppose the camera moved a large amount during the time between the first and second timestamps. Here, the embodiments will weight the value or influence of the MC image relatively low because that image is likely not reliable and thus should not provide a significant influence in the stack. These weights are recorded in the global weight map.

Accordingly, higher amounts of movement (including angular or translational movement) result in the MC image having less influence in the generation of the final temporally filtered image. Lesser amounts of movement result in the MC image having more influence in the generation of the final temporally filtered image.

Because the global weight map is based on the IMU data, the values included in the global weight map can all be uniform across the entire global weight map. Similarly, the global weight map can include a single weight or single weight value for the entirety of the global weight map, where this value is based on the IMU data. In this sense, the amount of movement is transformed or mapped into a weighting metric. Larger movements result in smaller weights being attributed to the first image while smaller movements result in larger weights being attributed to the first image.

In some cases, the map for translating IMU data to weight data can also optionally be based on a negative exponential function, with final values ranging between 0 and 1. More camera motion indicates that the first image should not meaningfully influence the temporal filtering process while less camera motion indicates that the first image should help influence the temporal filtering process. In some optional cases, the global weight map can also include one or more of an analog gain setting of the camera or a digital gain setting of the camera.

FIG. 5 shows how the global weight map 550 is generated based on the IMU data 515. The resolution of the global weight map 550 can be designed to match the upscaled resolution of the local weight map 540. The resolution 545A reflects the varying resolutions of the images and local weight map.

Next, in FIG. 4, method 400 includes an act (act 435) of generating a final weight map based on the local weight map only, the global weight map only, or a combination of the local weight map and the global weight map. FIG. 5 shows how the final weight map 555 is based on both the local weight map 540 (after upscaling) and the global weight map 550. In some embodiments, the final weight map is generated by combining the global weight map with the local weight map by multiplying weights included in the global weight map against weights included in the local weight map. Beneficially, the final weight map provides pixel-based weights that regulate the generation of a resulting temporally filtered image. The analog gain 565 and the digital gain 570 illustrate how these parameters can also be considered for both the local weight map 540 and the global weight map 550.

As shown in act 440 of FIG. 4, the final weight map is then used to generate a filtered image. During a subsequent iteration of the filtering weight computation, act 445 involves causing the filtered image to be used as the previously acquired image. In other words, the filtered image is provided as feedback back into the filtering weight computation. In FIG. 5, the final weight map 555 is generated, and the filtered image 560 is generated based on the final weight map 555. The filtered image 560 can then be provided as feedback and can be provided as the first image 505 for a subsequent iteration of the filtering weight computation 500.

Figure 6:
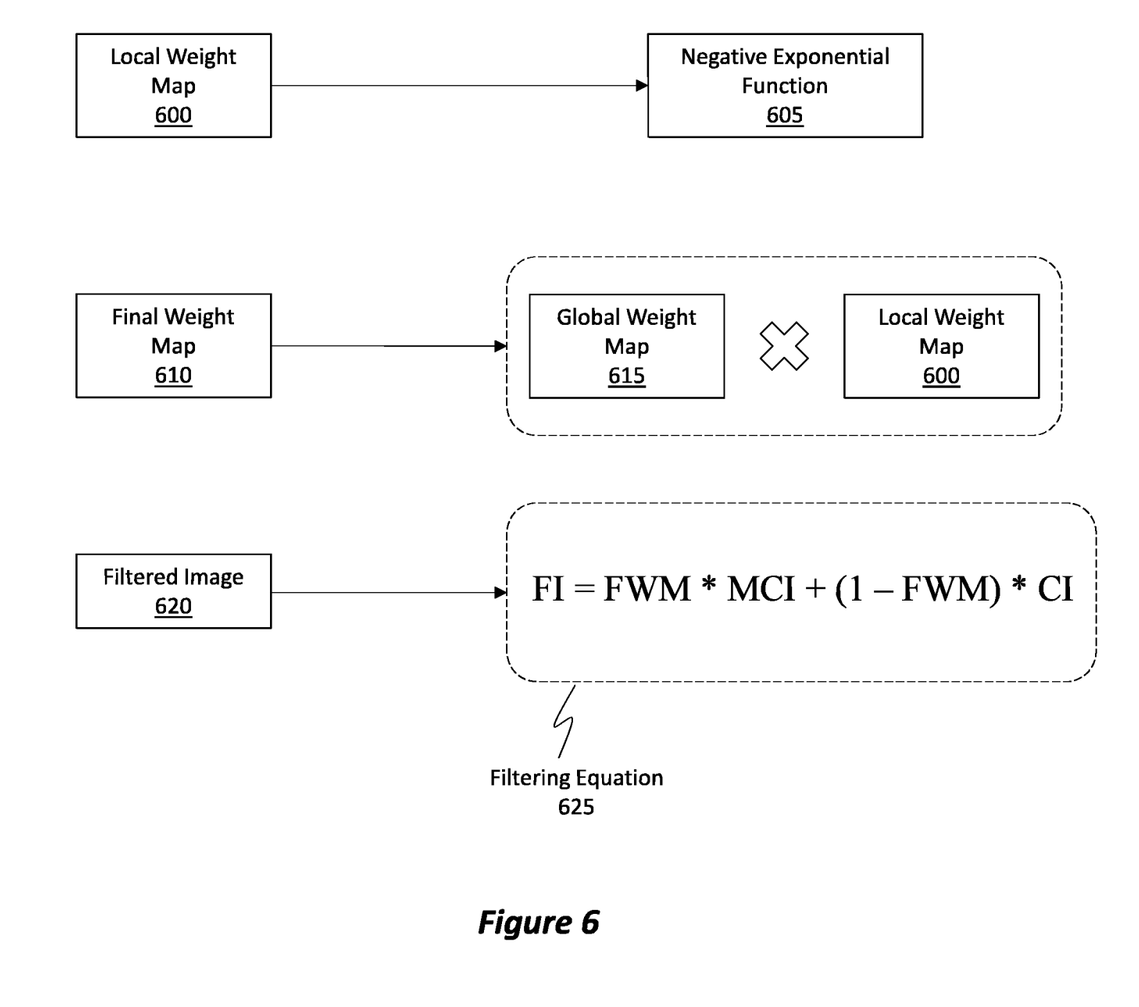
FIG. 6 illustrates various aspects related to how maps and images are generated.

FIG. 6 provides some additional details. Specifically, FIG. 6 shows a local weight map 600, which is representative of the local weight map 540 of FIG. 5. Here, the local weight map 600 is generated using a negative exponential function 605. That is, the differences in intensities, which are recorded in the difference image, are fed as input into the negative exponential function 605. That function maps or converts the differences into weight values. Larger differences result in weight values that converge to 0 while smaller differences result in weight values that converge to 1.

The final weight map 610 is representative of the final weight map 555 of FIG. 5. The final weight map 610 is computed by multiplying the global weight map 615 against the local weight map 600. Recall, the resolutions of those two different maps can be the same, so the matrixes or mappings can be multiplied against one another. By multiplying these maps, the embodiments determine the level of influence the MC image will have when stacked with the second image. Additionally, by performing the multiplication operation, the final weight map 555 minimizes movement of the camera and also minimizes ghosting effects.

The filtered image 620 is representative of the filtered image 560 from FIG. 5. The filtered image 620 is generated using the final weight map 610. More specifically, the filtered image 620 is generated using a filtering equation 625, which is provided in FIG. 6 and which is provided below.

$$FI = FWM * MCI + (1 - FWM) * CI$$

FI stands for "filtered image" (i.e. filtered image 620). FWM stands for final weight map 610. Because the FWM is dependent on both the local weight map and the global weight map, the filtering equation 625 is therefore also dependent on both maps. MCI stands for motion compensated image (i.e. MC image 520A from FIG. 5). CI stands for the second image (e.g., second image 510 from FIG. 5). The filtered image 620 is thus computed using the filtering equation 625. The filtered image 620 can then be provided as a passthrough image to an HMD. Furthermore, additional modifications can be performed against the filtered image 620, such as perhaps performing visual alignment and overlaying operations.

By performing the disclosed operations, the embodiments significantly improve how temporal filtering is performed. Higher quality images are produced. Images with less or even no ghosting effects are also generated. As a direct result, the user's experience with the MR system is significantly improved. Furthermore, by performing the disclosed principles, the quality of the image will never be worse than the quality of the current image. In most cases, the quality will be significantly better.

By considering or factoring in the local weight mapping, the embodiments can mitigate the effects of a moving object. For instance, it might be the case that the areas in the image where the object was moving (as determined using the multiple consecutive images) have the quality of the current image, but for other areas of the resulting filtered image, the quality for those other areas will be enhanced. In this sense, it might be the case that various portions of the resulting output image are carved out in terms of quality, where those portions might have a different quality than other portions of the image. That different quality level might occur as a result of the object moving across the different images. Instead of displaying ghosting effects via the stacking effect, the embodiments just portray the object as it was at the time of the latest image. Nevertheless, the averaging processes mentioned herein can be performed in order to achieve higher image quality levels.

Example Computer/Computer Systems

Figure 7:
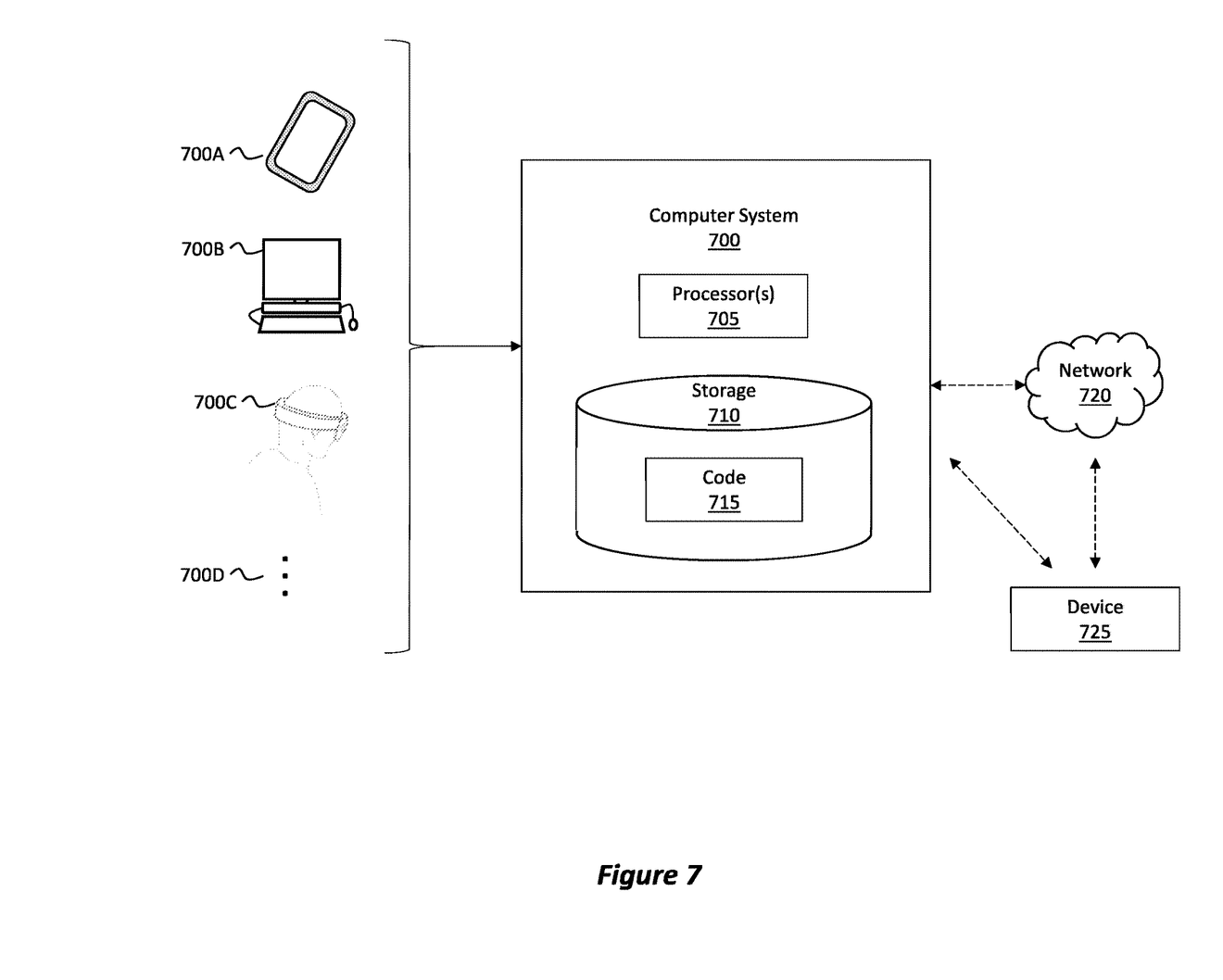
FIG. 7 illustrates an example computer system configured to perform any of the disclosed operations.

Attention will now be directed to FIG. 7 which illustrates an example computer system 700 that may include and/or be used to perform any of the operations described herein. Computer system 700 may take various different forms. For example, computer system 700 may be embodied as a tablet 700A, a desktop or a laptop 700B, a wearable device 700C, a mobile device, or a standalone device. The ellipsis 700D illustrates how other form factors can be used as well. The HMD 100 of FIG. 1 can be considered the computer system 700. Computer system 700 may also be a distributed system that includes one or more connected computing components/devices that are in communication with computer system 700.

In its most basic configuration, computer system 700 includes various different components. FIG. 7 shows that computer system 700 includes one or more processor(s) 705 (aka a "hardware processing unit") and storage 710.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("AS SP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 700. The different components, modules, engines, and services described herein may be implemented as objects or processors that execute on computer system 700 (e.g. as separate threads).

Storage 710 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 710 is shown as including executable instructions (i.e. code 715). The executable instructions represent instructions that are executable by the processor(s) 705 of computer system 700 to perform the disclosed operations, such as those described in the various methods.

The disclosed embodiments may comprise or utilize a special-purpose or general-purpose computer including computer hardware, such as, for example, one or more processors (such as processor(s) 705) and system memory (such as storage 710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 720. For example, computer system 700 can communicate with any number devices (e.g., device 725) or cloud services to obtain or process data. In some cases, network 720 may itself be a cloud network. Furthermore, computer system 700 may also be connected through one or more wired or wireless networks 720 to remote/separate computer systems(s) that are configured to perform any of the processing described with regard to computer system 700.

A "network," like network 720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing temporal filtering, said method comprising a filtering weight computation that includes:
    acquiring a first image having a first timestamp, the first image being generated by a camera;
    acquiring a second image having a second timestamp, the second image also being generated by the camera, wherein the first timestamp is before the second timestamp such that the first image is a previously acquired image relative to the second image;
    performing a motion compensation (MC) operation on the first image to account for motion that might have occurred during a time between the first timestamp and the second timestamp such that an MC image is generated;
    generating a difference image using the MC image and the second image, the difference image reflecting differences in intensities that exist between corresponding pixels in both the MC image and the second image;
    generating a final weight map based on a local weight map that is based on the differences in intensities in the difference image and a global weight map that is based on movement data that exists for the camera, wherein generating the final weight map further includes performing an upscaling operation to upscale the local weight map to match an original resolution of the first image;
    using the final weight map to generate a filtered image; and
    during a subsequent iteration of the filtering weight computation, causing the filtered image to be used as the previously acquired image.

2. The method of claim 1, wherein the first image is a low light image.

3. The method of claim 1, wherein the movement data is inertial measurement unit (IMU) data.

4. The method of claim 3, wherein the IMU data includes data describing an angular position of the camera and an orientation of the camera.

5. The method of claim 4, wherein the IMU data further includes data describing an acceleration of the camera.

6. The method of claim 1, wherein the camera operates at a rate between 30 frames per second and 120 frames per second.

7. The method of claim 1, wherein the camera operates at a rate between 60 frames per second and 90 frames per second.

8. The method of claim 1, wherein the camera moved after generating the first image and before the second image is generated.

9. The method of claim 1, wherein the MC image is down sampled.

10. The method of claim 1, wherein the second image is down sampled.

11. A computer system that performs temporal filtering via a filtering weight computation, said computer system:
    at least one processor; and
    at least one hardware storage device that stores instructions that are executable by the at least one processor to cause the computer system to:
        acquire a first image having a first timestamp, the first image being generated by a camera;
        acquire a second image having a second timestamp, the second image also being generated by the camera, wherein the first timestamp is before the second timestamp such that the first image is a previously acquired image relative to the second image;
        perform a motion compensation (MC) operation on the first image to account for motion that might have occurred during a time between the first timestamp and the second timestamp such that an MC image is generated;
        generate a difference image using the MC image and the second image, the difference image reflecting differences in intensities that exist between corresponding pixels in both the MC image and the second image;
        generate a final weight map based on a local weight map that is based on the differences in intensities in the difference image and a global weight map that is based on movement data that exists for the camera, wherein generating the final weight map includes an upscaling operation to upscale the local weight map to match an original resolution of the first image;
        use the final weight map to generate a filtered image; and
        during a subsequent iteration of the filtering weight computation, cause the filtered image to be used as the previously acquired image.

12. The computer system of claim 11, wherein the first and second images are down sampled.

13. The computer system of claim 12, wherein the first and second images are down sampled to a same resolution level.

14. The computer system of claim 12, wherein down sampling the first and second images removes, at least in part, a ghosting effect.

15. The computer system of claim 12, wherein said down sampling is a 4 pixel by 4 pixel down sampling.

16. The computer system of claim 11, wherein the first image and the second image are low light images.

17. A computer system that performs temporal filtering via a filtering weight computation, said computer system:
   at least one processor; and
   at least one hardware storage device that stores instructions that are executable by the at least one processor to cause the computer system to:
      acquire a first image having a first timestamp, the first image being generated by a camera;
      acquire a second image having a second timestamp, the second image also being generated by the camera, wherein the first timestamp is before the second timestamp such that the first image is a previously acquired image relative to the second image;
      perform a motion compensation (MC) operation on the first image to account for motion that might have occurred during a time between the first timestamp and the second timestamp such that an MC image is generated;
      generate a difference image using the MC image and the second image, the difference image reflecting differences that exist between corresponding pixels in both the MC image and the second image;
      generate a final weight map based on a local weight map that is based on the differences in the difference image and a global weight map that is based on movement data that exists for the camera, wherein the local weight map is structured to include analog gain data and digital gain data for generating the first and second images;
      use the final weight map to generate a filtered image; and
      during a subsequent iteration of the filtering weight computation, cause the filtered image to be used as the previously acquired image.

18. The computer system of claim 17, wherein the first and second images are low light images.

19. The computer system of claim 17, wherein the movement data is inertial measurement unit (IMU) data.

* * * * *